United States Patent [19]
Bush et al.

[11] Patent Number: 5,707,940
[45] Date of Patent: Jan. 13, 1998

[54] ENVIRONMENTALLY FRIENDLY WATER BASED DRILLING FLUIDS

[75] Inventors: James H. Bush; Richard W. Jahnke, both of Mentor, Ohio

[73] Assignee: The Lubrizol Corporation, Wickliffe, Ohio

[21] Appl. No.: 483,654

[22] Filed: Jun. 7, 1995

[51] Int. Cl.$^6$ .................................... C09K 7/00
[52] U.S. Cl. .................. 507/138; 507/134; 507/139; 507/247; 507/265; 507/266
[58] Field of Search .................. 507/247, 265, 507/266, 138, 134, 139

[56] References Cited

U.S. PATENT DOCUMENTS

| | | | |
|---|---|---|---|
| 2,756,210 | 7/1956 | Raifsnider | 507/265 |
| 3,014,862 | 12/1961 | Tailleur | 507/131 |
| 3,027,324 | 3/1962 | Rosenberg et al. | 507/134 |
| 3,047,493 | 7/1962 | Rosenburg . | |
| 3,048,538 | 8/1962 | Rosenberg et al. | 507/116 |
| 3,214,374 | 10/1965 | Sample et al. | 507/134 |
| 3,560,507 | 2/1971 | Wakeman et al. | 546/140 |
| 3,585,136 | 6/1971 | Standford et al. | 507/244 |
| 3,703,477 | 11/1972 | Jones | 252/391 |
| 3,712,393 | 1/1973 | Sheldahl et al. | 507/103 |
| 3,761,410 | 9/1973 | Mondshine et al. . | |
| 3,810,836 | 5/1974 | Norton . | |
| 3,840,460 | 10/1974 | Sheldahl et al. | 507/103 |
| 3,862,663 | 1/1975 | Curtice et al. | 507/103 |
| 4,115,282 | 9/1978 | Grasshoff . | |
| 4,141,840 | 2/1979 | Walker et al. | 507/109 |
| 4,172,800 | 10/1979 | Walker | 507/109 |
| 4,356,096 | 10/1982 | Cowan et al. | 507/126 |
| 4,435,297 | 3/1984 | Forsberg . | |
| 4,517,100 | 5/1985 | Nance et al. . | |
| 4,614,600 | 9/1986 | Schilling et al. | 507/260 |
| 4,658,036 | 4/1987 | Schilling | 548/513 |
| 4,770,803 | 9/1988 | Forsberg . | |
| 4,776,966 | 10/1988 | Baker . | |
| 4,802,998 | 2/1989 | Mueller et al. | 507/134 |
| 5,091,100 | 2/1992 | Trivett . | |
| 5,334,318 | 8/1994 | Vinci et al. . | |
| 5,338,471 | 8/1994 | Lal . | |

*Primary Examiner*—José G. Dees
*Assistant Examiner*—Valerie Fee
*Attorney, Agent, or Firm*—James L. Cordek; Frederick D. Hunter; Joseph P. Fischer

[57] ABSTRACT

An oil-in-water emulsion composition is disclosed which comprises a mixture of brine and;

(A) at least one natural oil or synthetic triglyceride of the formula

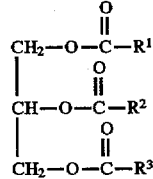

wherein $R^1$, $R^2$ and $R^3$ are independently saturated or unsaturated aliphatic groups that contain from about 7 to about 23 carbon atoms;

(B) at least one alcohol, $R^4OH$ wherein $R^4$ is an aliphatic group containing from 1 up to about 18 carbon atoms;

(C) at least one emulsifier; and (D) at least one sulfurized composition wherein (B), (C) and (D) are soluble and reside within (A).

41 Claims, No Drawings

ENVIRONMENTALLY FRIENDLY WATER BASED DRILLING FLUIDS

FIELD OF THE INVENTION

The present invention relates to an oil-in-water emulsion system for environmentally friendly water based drilling fluids and to a method of drilling a well borehole which encompasses using the environmentally friendly water based drilling fluids. In addition to brine, the system comprises (A) at least one triglyceride, (B) at least one alcohol, (C) at least one emulsifier, and (D) at least one sulfurized composition.

BACKGROUND OF THE INVENTION

The primary functions of a drilling fluid or mud are: to carry chips and cutting produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and shutdown.

Useful drilling fluids 6r muds must maintain theological and viscosity properties under normal operation conditions. Also, the drilling fluids or muds must be able to suspend cuttings and weighting materials upon stopping of circulation of the drilling fluid. It is desirable to have drilling fluids or muds which maintain thixotrophy and rheology even with increased solids.

U.S. Pat. No. 5,338,471 (Lal, Aug. 16, 1994) relates to vegetable oils that possess at least 60 percent monounsaturation content, vegetable oils that are transesterified and contain at least one pour point depressant. In addition to pour point depressants, the vegetable oil and transesterified product also contains a performance additive designed to enhance the performance of the vegetable oil and transesterified product when used in hydraulic fluids, two-cycle (two stroke) internal combustion engines, gear oils, and passenger car motor oils.

U.S. Pat. No. 5,334,318 (Vinci et al., Aug. 2, 1994) deals with a lubricating composition comprising:

(A) an oil of lubricating viscosity;

(B) the reaction product of at least one polycarboxylic compound having at least one hydrocarbon-based substituent of about 12 to 500 carbon atoms with at least one of (I) a N-(hydroxyl-substituted hydrocarbyl) amine or (ii) a hydroxyl-substituted poly (hydrocarbyloxy) derivative of said amine;

(C) an active sulfur containing organic compound;

(D) at least one alkali metal or alkaline earth metal containing compound.

U.S. Pat. No. 5,091,100 (Trivett, Feb. 25, 1992) provides a solid film prelube emulsion comprising a fatty acid triglyceride-in-water emulsion. The emulsion is considered a high temperature prelube emulsion in that the melting point of the dried emulsion coating upon evaporation of the aqueous carrier is between 170° F. and 180° F. Lubricant can easily be applied as is to a metal substrate via a roll coater system by one of two methods:

(a) lubricant is warmed and applied to a warm metal substrate, (b) lubricant is applied at ambient temperature to a metal substrate at ambient temperature. Depending upon the choice of application, a series of warm ovens may be necessary to evaporate the aqueous carrier, reflow the coating following drying or both. Under normal application conditions, the water readily evaporates leaving a dry, solid film prelube coating on the metal substrate.

U.S. Pat. No. 4,776,966 (Baker, Oct. 11, 1988) relates to a drilling fluid composition of the invert oil-based type, wherein there is incorporated (i) as the agent for emulsifying the brine phase in the oil phase a block or graft copolymer of the general formula $(A-COO)_m B$, wherein A and B represent polymeric components and m is an integer at least 2, and (ii) as the agent for dispersing solid particulate matter in the oil phase a surfactant containing a hydrophobic component which is a saturated or unsaturated hydrocarbon chain containing from 30 to 500 carbon atoms and a polar component which is capable of becoming absorbed on to the surface of the said solid particulate matter.

U.S. Pat. No. 4,770,803 (Forsberg, Sep. 13, 1988) relates to aqueous compositions and, more particularly, to aqueous compositions containing carboxylic salts that are useful as dispersants and/or solubilizers. These aqueous compositions encompass both aqueous concentrates and water-based functional fluids.

U.S. Pat. No. 4,517,100 (Nance et al., May 14, 1985) relates to wellbore fluids which are aqueous containing about 0.5 to 5 volume % preferably 1 to 2 volume % of a lubricant composition comprising a mixture of:

(a) a chlorinated component of chlorinated normal paraffins having 9 to 20 carbon atoms, chlorinated esters of fatty acids, chlorinated waxes, chlorinated olefins or mixtures thereof, and (b) a sulfurized component of sulfurized fatty acid, sulfurized esters of fatty acids, sulfurized polymerized fatty acids, sulfurized olefins, or mixtures thereof., in proportions to produce a composition containing 15 to 30 weight percent chlorine and 2 to 10 weight percent sulfur.

U.S. Pat. No. 4,435,297 (Forsberg, Mar. 6, 1984) relates to a nitrogen-containing, phosphorus-free carboxylic acid derivative made by reaction of (A) at least one carboxylic acid acylating agent with (B) at least one alkanol tertiary amine, said acylating agent having at least one hydrocarbyl-based substituent of about 20 to about 200 carbon atoms and said alkanol amine (B) having one hydroxyl group and a total of up to about 40 carbon atoms.

U.S. Pat. No. 4,115,282 (Grasshoff, Sep. 19, 1978) provides a biodegradable grease for rails, rail points and crossings and rail vehicles consisting of a lubricating oil, water, a thickening agent and optionally additional additives. More specifically, the grease composition comprises a biodegradable vegetable or animal oil or fat in an aqueous mixture containing a vegetable-derived thickening agent or gel-forming agent.

U.S. Pat. No. 3,810,836 (Norton, May 14, 1974) relates to a mineral-oil-based lubricant for use in drilling of mineral ore deposits, which is non-staining towards sample cores withdrawn during the drilling. It can be prepared by combining a paraffinic oil, with minor amounts of a nonionic emulsifier package and a sulfur-containing extreme pressure agent. The nonionic emulsifier package can be a combination of an alkoxylated fatty acid ester and an alkoxylated alkyl phenol or a combination of fatty acid sorbitan polyesters which have been alkoxylated to varying extents.

U.S. Pat. No. 3,761,410 (Mondshine et al., Sep. 25, 1973) provides water base drilling fluids having enhanced lubricating properties under low load, non-extreme pressure conditions by incorporating therein a material selected from the group consisting of vegetable oils, animal fats, fatty acids, fatty acid esters, fatty amides, their sulfurized or sulfated reaction products, and mixtures thereof, and a water insoluble alcohol having from four to fifteen carbon atoms. Another aspect of the invention provides a novel lubricating composition and process for synergistically increasing the lubricity of water base drilling fluids and the like.

U.S. Pat. No. 3,047,493 (Rosenburg, Jul. 31, 1962) relates to a water base drilling mud having a Timken load carrying capacity above about 30 pounds and a rotary drilling process using the mud. The drilling mud contains a small amount, sufficient to give the mud a Timken load carrying capacity above about 30 pounds, of a carboxylic acid compound dispersed in the water. The carboxylic acid compounds which can be used to prepare the drilling muds are fatty acids having at least 8 carbon atoms per molecule, triglycerides of fatty acids, rosin acids, and dibasic acids. Such compounds are identified by the term "load carrying agents" in this specification. The term "water base drilling mud" refers to drilling muds in which there is no substantial oil phase other than the load carrying agent and does not include oil-in-water emulsions in which a hydrocarbon oil phase constitutes at least about 5% of the drilling mud. These drilling muds cause a marked increase in life of bearings of rotary drill bits and a reduction of the friction between the drill pipe and the borehole wall.

SUMMARY OF THE INVENTION

An oil-in-water emulsion composition is disclosed which comprises a mixture of brine and;

(A) at least one natural oil or synthetic triglyceride of the formula

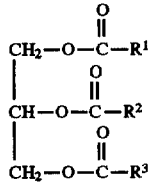

wherein $R^1$, $R^2$ and $R^3$ are independently saturated or unsaturated aliphatic groups that contain from about 7 to about 23 carbon atoms;

(B) at least one alcohol, $R^4OH$ wherein $R^4$ is an aliphatic group containing from 1 up to about 18 carbon atoms;

(C) at least one emulsifier; and (D) at least one sulfurized composition wherein (B), (C) and (D) are soluble and reside within (A).

Also disclosed is a method of drilling a well borehole which encompasses using the oil-in-water emulsion composition.

DETAILED DESCRIPTION OF THE INVENTION

The term "oil-in-water emulsion" refers to emulsions wherein the continuous phase is water and the discontinuous phase is oil and the components are soluble within the oil, the discontinuous oil phase, being dispersed in the continuous water phase.

Brine

The brine useful in the composition of this invention may be naturally occurring field brine or one formulated by various salts. The salts include calcium chloride, magnesium chloride, sodium chloride, potassium chloride, zinc chloride and zinc bromide. The calcium chloride is generally present in an amount of from about 1% to about 40% by weight of the brine. The magnesium chloride is generally present in an amount of from about 0.5% to about 24% by weight of the brine. The sodium chloride is generally present in an amount of from about 1% to about 27% by weight of the brine. The potassium chloride is present in an amount of from about 0.5% to about 24% by weight of the brine. The zinc chloride or zinc bromide is generally present in an amount of from about 0.5% to about 80% by weight of the brine.

(A) The Natural Oil or Synthetic Triglyceride

Typical oil based drilling fluids in which oil is the continuous phase are mineral oil based or hydrocarbon solvent based. These fluids are both more expensive and harmful to the environment. Water based drilling fluids in which water is the continuous phase and that contain natural oils or synthetic triglycerides are both less expensive and also environmentally friendly in comparison to those drilling fluids that are mineral oil based or hydrocarbon solvent based.

In practicing this invention, employed is at least one natural oil or synthetic triglyceride of the formula

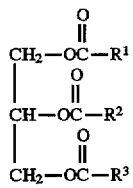

wherein $R^1$, $R^2$, and $R^3$ are independently saturated or unsaturated aliphatic hydrocarbyl groups that contain from about 7 to about 23 carbon atoms. The term "hydrocarbyl group" as used herein denotes a radical having a carbon atom directly attached to the remainder of the molecule. The aliphatic hydrocarbyl groups include the following:

(1) Aliphatic hydrocarbon groups; that is, alkyl groups such as heptyl, nonyl, decyl, undecyl, tridecyl, heptadecyl, octyl; alkenyl groups containing a single double bond such as heptenyl, nonenyl, undecenyl, tridecenyl, heptadecenyl, heneicosenyl; alkenyl groups containing 2 or 3 double bonds such as 8,11-heptadecadienyl and 8,11,14-heptadecatrienyl, and alkynyl groups containing the triple bonds. All isomers of these are included, but straight chain groups are preferred.

(2) Substituted aliphatic hydrocarbon groups; that is groups containing non-hydrocarbon substituents which, in the context of this invention, do not alter the predominantly hydrocarbon character of the group. Those skilled in the art will be aware of suitable substituents; examples are hydroxy, carbalkoxy, (especially lower carbalkoxy) and alkoxy (especially lower alkoxy), the term "lower" denoting groups containing not more than 7 carbon atoms.

(3) Hetero groups; that is, groups which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen, nitrogen and sulfur.

Naturally occurring triglycerides are vegetable oil triglycerides and animal fat triglycerides. The preferred vegetable oil triglycerides comprise sunflower oil, safflower oil, corn oil, soybean oil, rapeseed oil, meadowfoam oil, lesquerella oil, or castor oil. The preferred animal fat triglycerides comprise beef tallow, fish oil or lard oil. The synthetic triglycerides are those formed by the reaction of one mole of glycerol with three moles of a fatty acid or mixture of fatty acids. The fatty acids contain from about 6 to about 22 carbon atoms. The preferred fatty acids comprise octanoic acid, nonanoic acid, decanoic acid, lauric acid, myristic acid, palmitic acid, stearic acid, eicosanoic acid, triconanoic acid, oleic acid, linoleic acid, linolenic acid or ricinoleic acid.

In a preferred embodiment, the natural oil is a genetically modified vegetable oil. Within this embodiment, $R^1$, $R^2$ and $R^3$ are aliphatic groups that contain from 7 to about 23 carbon atoms and have a monounsaturated character of at least 60 percent, preferably at least 70 percent and most preferably at least 80 percent. Naturally occurring triglycerides having utility in this invention are exemplified by vegetable oils that are genetically modified such that oil produced by the plants contain a higher than normal oleic acid content. Normal sunflower oil has an oleic acid content of 18–40 percent. By genetically modifying the sunflower plants, a sunflower oil can be obtained wherein the oleic content is from about 60 percent up to about 92 percent. That is, the $R^1$, $R^2$ and $R^3$ groups are heptadecenyl 1 groups and the $R^1COO^-$, $R^2COO^-$, and $R^3COO^-$ that are attached to the 1,2,3-propanetriyl group —$CH_2CHCH_2$— are the residue of an oleic acid molecule. U.S. Pat. Nos. 4,627,192 and 4,743,402 are herein incorporated by reference for their disclosure to the preparation of high oleic sunflower oil.

For example, a triglyceride comprised exclusively of an oleic acid moiety has an oleic acid content of 100% and consequently a monounsaturated content of 100%. Where the triglyceride is made up of acid moieties that are 70% oleic acid, 10% stearic acid, 13% palmitic acid, and 7% linoleic acid, the monounsaturated content is 70%. The preferred triglyceride oils are high oleic (at least 60 percent) acid triglyceride oils. Typical high oleic vegetable oils employed within the instant invention are high oleic safflower oil, high oleic corn oil, high oleic rapeseed oil, high oleic sunflower oil, high oleic cottonseed oil, high oleic canola oil, high oleic peanut oil, and high oleic soybean oil. A preferred high oleic vegetable oil is high oleic sunflower oil obtained from Helianthus sp. This product is available from SVO Enterprises, Eastlake, Ohio as Sunyl® high oleic sunflower oil. Sunyl 80 oil is a high oleic triglyceride wherein the acid moieties comprise about 80 percent oleic acid and Sunyl 90 oil is a high oleic triglyceride wherein the acid moieties comprise about 90 percent oleic acid. Another preferred high oleic vegetable oil is high oleic rapeseed oil obtained from *Brassica campestris* or *Brassica napus*, also available from SVO Enterprises. RS80 oil signifies a rapeseed oil wherein the acid moieties comprise about 80 percent oleic acid.

It is to be noted the olive oil is excluded as a genetically modified vegetable oil (A) in this invention. The oleic acid content of olive oil typically ranges from 65–85 percent. This content, however, is not achieved through genetic modification, but rather is naturally occurring.

It is further to be noted that genetically modified vegetable oils have high oleic acid contents at the expense of the di- and tri-unsaturated acids. A normal sunflower oil has from 20–40 percent oleic acid moieties and from 50–70 percent linoleic acid moieties. This gives a 90 percent content of mono- and di-unsaturated acid moieties (20+70) or (40+50). Genetically modifying vegetable oils generate a low di- or tri-unsaturated moiety vegetable oil. The genetically modified oils of this invention have an oleic acid moiety:linoleic acid moiety ratio of from about 2 up to about 90. A 60 percent oleic acid moiety content and 30 percent linoleic acid moiety content of a triglyceride oil gives a ratio of 2. A triglyceride oil made up of an 80 percent oleic acid moiety and 10 percent linoleic acid moiety gives a ratio of 8. A triglyceride oil made up of a 90 percent oleic acid moiety and 1 percent linoleic acid moiety gives a ratio of 90. The ratio for normal sunflower oil is about 0.5 (30 percent oleic acid moiety and 60 percent linoleic acid moiety).

(B) The Alcohol

Within the instant invention, the function of the alcohol is to act as a co-emulsifier. At least one alcohol of the formula $R^4OH$ wherein $R^4$ is an aliphatic group of from 1 up to about 18 carbon atoms is employed. The alcohol $R^4OH$ may be primary or secondary and $R^4$ is branched or straight chained preferably from 3 up to about 12 carbon atoms and most preferable $R^4$ is branch chained and contains from 3 up to about 9 carbon atoms.

Alcohols having utility as component (B) in this invention are the saturated alcohols of methyl alcohol, ethyl alcohol, the isomeric propyl alcohols and the isomeric primary and secondary butyl, pentyl, hexyl, heptyl, octyl, decyl, dodecyl, tridecyl, tetradecyl, hexadecyl, and octadecyl alcohols; the unsaturated alcohols of allyl alcohol, crotyl alcohol, methylvinylmethanol, and the monounsaturated isomeric primary and secondary hexenyl, octenyl, decenyl, dodecenyl, tetradecenyl, hexadecenyl and octadecenyl alcohols. A preferred alcohol is 4-methyl-2-pentanol having the structure

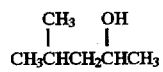

The Emulsifier

Within the instant invention, the function of the emulsifier is to emulsify the sulfurized composition into the water based drilling fluids. Three different types of emulsifiers are envisioned although any emulsifier capable of emulsifying the sulfurized composition into the water based drilling fluids can be used. One emulsifier is a polyolefin amine ester/salt of a carboxylic acylating agent and an alkanol tertiary amine, and another emulsifier is a polyolefin ester of a carboxylic acylating agent and an alcohol and the third emulsifier relates to a coupled polyolefin salt wherein the carboxylic acylating agents are coupled with a bridging compound and the coupled carboxylic acylating agents are reacted with an amine.

The polyolefin amine ester/salt is represented by a formula selected from the group of formulae (I) and (II)

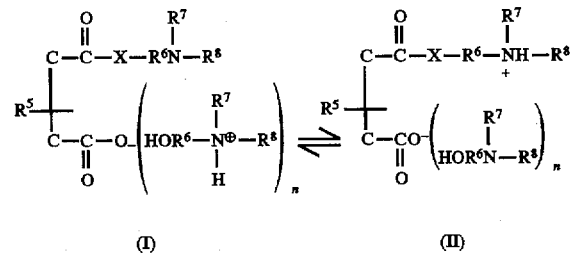

wherein n is zero or one, X is oxygen or NH; $R^5$ is hydrocarbyl group which is preferably a polyisobutenyl group containing from about 20 to about 500 carbon atoms; $R^6$ is an alkylene moiety containing from 1 to 4 carbon atoms and is preferably ethylene. The substituents $R^7$ and $R^8$ ate each independently hydrogen, alkyl or hydroxy alkyl moieties, and are each preferably ethyl moieties. A state of equilibrium exists between (I) and (II). To insure charge balancing, when n of (I) is zero a positively charged ion such as hydrogen will attach to the oxygen.

The polyolefin amine ester/salts are made by the reaction of (a) at least one carboxylic acid acylating agent of the formula

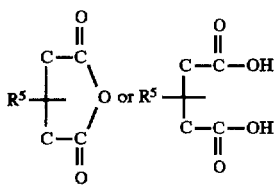

with (b) at least one tertiary alkanol amine, said acylating agent (a) having at least one hydrocarbyl-based substituent $R^5$ of about 20 to about 500 carbon atoms and said alkanol amine (b) having one hydroxyl group and a total of up to about 12 carbon atoms.

The individual reactants (a) and (b) and the reaction of (a) and (b) will now be discussed in detail in order to provide a disclosure of a representative number of examples of each. U.S. Pat. No. 4,435,297 is incorporated herein by reference for purposes of disclosing examples of reactants (a) and (b), the reaction between (a) and (b) and the resulting reaction product.

The acylating agents (a) used in making the polyolefin amine ester/salts are well known to those skilled in the art. See, for example, the following U.S. Patents which are hereby incorporated by reference for their disclosures relating to the preparation of carboxylic acid acylating agents: U.S. Pat. Nos. 3,219,666; 3,272,746; 3,381,102; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Typically, these acylating agents are polycarboxylic acylating agents such as the succinic acid acylating agents derived from maleic acid, its isomers, anhydride and chloro and bromo derivatives. A dicarboxylic acid in the form of a succinic acid derivative is the preferred acylating agent (a).

These acylating agents have at least one hydrocarbyl-based substituent of about 20 to about 500 carbon atoms. Generally, this substituent has an average of at least about 30, and often at least about 50 carbon atoms. Typically, this substituent has a maximum average of about 300, and often about 200 carbon atoms. As used herein, the term "hydrocarbon-based", "hydrocarbon-based substituent"; "hydrocarbon radical" and the like denotes the substituent having a carbon atom directly attached to the remainder of the molecule (i.e., the carboxylic acylating portion) and having predominantly hydrocarbyl character within the context of this invention.

Examples of substituents which might be useful in connection with the present invention include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituted aromatic nuclei and the like as well as cyclic substituents wherein the ring is completed through another portion of the molecule (that is, for example, any two indicated substituents may together form an alicyclic radical);

(2) substituted hydrocarbon substituents, that is, those substituents containing nonhydrocarbon radicals which, in the context of this invention, do not alter the predominantly hydrocarbon substituent; those skilled in the art will be aware of such radicals (e.g., halo (especially chloro and fluoro), hydroxy, alkoxy, mercapto, alkylmercapto, nitro, nitroso, sulfonyl sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as, e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbon.

In general, the hydrocarbon-based substituents of at least 20 carbon atoms present in the acylating agents used in this invention are free from acetylenic unsaturation; ethylenic unsaturation, when present will generally be such that there is not more than one ethylenic linkage present for every ten carbon-to-carbon bonds in the substituent. The substituents may be completely saturated or contain ethylenic unsaturation.

As noted above, the hydrocarbon-based substituents present in the acylating agents of this invention are derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1. or polyolefinic monomers (usually di-olefinic monomers such as butadiene-1,3 and isoprene). Usually these monomers are terminal olefins, that is, olefins characterized by the presence of the group $$>C=CH_2$$

However, certain internal olefins can also service as monomers (these are sometimes referred to as medial olefins). When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins to two to six carbon atoms, especially those of two to four carbon atoms.

Specific examples of terminal and medial olefin monomers which can be used to prepare the olefin polymers from which the hydrocarbon based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene- 1,2 butadiene-1,3 pentadiene-1,2 pentadiene-1,3, isoprene, hexadiene-1,5, 2-chlorobutadiene-1,3, 2-methylheptene-1, 3-cyclohexylbutene-1, 3,3-dimethylpentene-1, styrenedivinylbenzene, vinylacetate, allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s. As indicated above, polyisobutenyl substituents are preferably in connection with the present invention. These polyisobutenyl polymers may be obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These poly(isobutene)s contain predominantly (that is, greater than 80% of the total repeat units) isobutene repeat units of the configuration

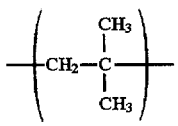

Typically, the hydrocarbyl-based substituent in the carboxylic acid acylating agent as used in the present invention is a hydrocarbyl, alkyl or alkenyl group of about 30, often about 50, to about 500, sometimes about 300, carbon atoms. For convenience herein, such substituents are represented by the indicia "hyd".

As noted above, typical acylating agents (a) used in making the derivatives of this invention are substituted succinic acids or derivatives thereof. In this case, the preferred acylating agent (a) can be represented by the formulae:

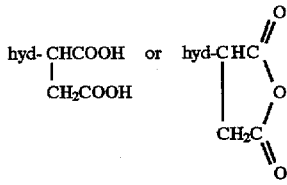

Such succinic acid acylating agents can be made by the reaction of maleic anhydride, maleic acid, or fumaric acid with the afore-described olefin polymer, as is shown in the patents referred to above. Generally, the reaction involves merely heating the two reactants at a temperature of about 150° C. to about 200°. Mixtures of these polymeric olefins, as well as mixtures of these unsaturated mono- and polycarboxylic acids can also be used.

The tertiary alkanol amines used in making the polyolefin amine ester/salt have one hydroxyl group per molecule and normally up to about 40 carbon atoms. These hydroxyl groups are bonded to an alkyl group which in turn is bonded to the amine portion of the molecule. The two remaining substituents bonded to the tertiary amine nitrogen are hydrocarbyl groups each having one to about 20 carbon atoms. Usually they will also be alkyl groups, but they can be alkenyl groups with one olefinic bond. Typically they are lower alkyl groups of up to seven carbons, though they can also be aryl, aralkyl, alkaryl, cycloalkyl, alkyl, and cycloalkylalkyl groups. Mixtures of two or more of the amines (b) can also be used.

A typical class of useful amines can be represented by the formula:

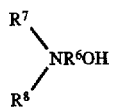

wherein each $R^7$ and $R^8$ are independently an alkyl group of one to about 4 carbon atoms and $R^6$ is a straight or branched chain alkylene group of about 2 to about 4 carbon atoms. The N,N-dialkyl alkanolamines within the above formula are particularly preferred, especially these wherein each of $R^7$ and $R^8$ is independently a lower alkyl and $R^6$ is lower alkylene. The $R^7$ and $R^8$ groups can be joined by a carbon-to-carbon bond. The most preferred alkanol amine (b) is N,N-diethyl ethanol amine and that N,N-dimethyl-2-hydroxybutyl amine is useful.

Now that a disclosure has been given with respect to both (a) and (b), a general description will be given of the reaction of (a) and (b). Although an extremely large number of reaction products are possible, the present invention is only concerned with such reaction products wherein an internal salt is formed. The formation of such internal salts will be described in further detail below.

The reaction of acylating agent (a) with the alkanol amine (b) can be carried out at a temperature ranging from about 30° C. to the decomposition temperature of one or more of the reaction components and/or products. Typically, it is carried out at a temperature in the range of about 50° C. to about 150° C. The reaction is preferably carried out under ester-forming conditions and the product thus formed is an ester/salt. This salt is either an internal salt involving residues of a molecule of acylating agent and of amine, wherein one of the carboxyl groups becomes ionically bound to a nitrogen atom within the same group or an external salt wherein the ionic salt group is formed with a nitrogen atom which is not part of the same molecule. Structures showing the internal and internal salts are shown as formulae (I) and (II) within the disclosure for the emulsifier as noted above.

Mixtures of acylating agents (a) and/or mixtures of alkanol amines (b) can be used. Generally, the equivalent ratio of acylating agent to alkanol amine formed is in the range of about 0.5 to about 3 equivalents of amine per equivalent of carboxylic acylating agent. An equivalent of carboxylic acylating agent can be determined by dividing the molecular weight of the acylating agent by the number of carboxyl functions. This can usually be determined from the structural formula of the acylating agent or empirically through well-known titration procedures. Thus a succinic anhydride has an equivalent weight of half its molecular weight. An equivalent of alkanol amine is equal to its molecular weight. Preferred equivalent ratios of acylating agent (a) to amine (b) is in the range of about 1:1 to about 1:2.5.

Usually the agent (a) and amine (b) are reacted at a temperature below about 100° C., often in the absence of additional solvent/diluents.

The following are specific examples of the preparation of polyolefin amine ester/salts. In these examples all parts and percentages are by weight unless expressly stated to the contrary and all temperatures are in degrees Celsius, as in the case throughout the specification and appended claims.

EXAMPLE C-1

To a charge of 2,240 parts of a poly(isobutene)-substituted succinic anhydride (having a molecular weight of 1,120) heated in a resin kettle with stirring to about 90° slowly add over a two-hour period 468 parts of diethyl ethanol amine.

Continue heating for an additional hour at about 90°. The desired reaction product is a viscous, clear, brown-tinted liquid at room temperature.

EXAMPLE C-2

To a charge of 6,720 parts of the succinic anhydride described in Example C-1, heated to 90° with stirring, slowly add over 1.5 hours 702 parts of diethyl ethanol amine. Heat this intermediate mixture for an additional 0.5 hour at 90°. Then slowly add 366 parts of monoethanol amine. Hold the mixture at 90° for a final 0.5 hour and cool to provide a clear brown, viscous liquid product.

The second emulsifier, the polyolefin ester is formed by the reaction of

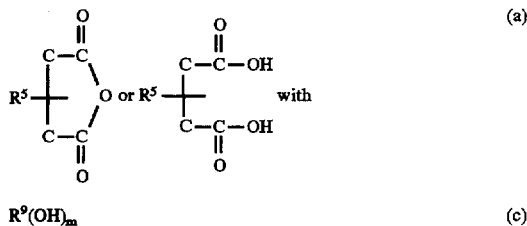

wherein $R^5$ is a hydrocarbyl group as defined in the polyolefin amine ester/salt, $R^9$ is a hydrocarbyl group containing from about 2 to about 40 carbon atoms and m is an integer of from 2 to about 10.

The polyolefin esters are made by the reaction of (a) at least one carboxylic acid acylating agent, as defined above within the polyolefin amine/ester salts, and (c) an alcohol $R^9(OH)_m$. Within the alcohol $R^9$ is a hydrocarbyl group containing from about 2 to about 40 carbon atoms and m is an integer of from 2 to about 10.

The structure of the polyolefin ester is a function of the equivalents ratio of (a):(c) and also the value of the subscript m of (c). The higher the value of m in conjunction with the higher the equivalent ratio of (a):(c), the greater the degree of cross-linking within the polyolefin ester.

A discussion of the equivalent weight of (a) appears within the disclosure of the polyolefin amine/ester salt. An equivalent weight of alcohol (c) is its molecular weight divided by the total number of hydroxyl groups present within the molecule (m). Thus an equivalent weight of ethylene glycol is one-half its molecular weight.

The alcohols useful as component (c) include those compounds of the general formula $R^9(OH)_m$ 

wherein $R^9$ is a hydrocarbyl group comprising a monovalent or polyvalent organic group joined to the —OH groups through carbon-to-oxygen bonds (that is, —COH wherein the carbon is not part of a carbonyl group) and m is an integer of from 2 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. The polyhydric alcohols corresponding to the formula $R^9(OH)_m$ preferably contain not more than about 40 carbon atoms, more preferably not more than about 20 carbon atoms. The alcohols may contain non-hydrocarbon substituents or groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as —$CH_2CH_2$—$XCH_2CH_2$ where X is —O— or —S—).

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least two OH groups.

The polyhydric alcohols useful in this invention include polyhydroxy aromatic compounds. Polyhydric phenols and naphthols are useful hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 2 to about 4 hydroxy groups. The aromatic hydroxy compounds are illustrated by the following specific examples: resorcinol, catechol, p,p'-dihydroxy-biphenyl, hydroquinone, pyrogallol, phloroglycinol, hexylresorcinol, orcinol, etc.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms preferred in ethylene glycol.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamnose, mannose, glyceraldehyde, and galactose.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, glyconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like. Aliphatic alcohols containing at least about 3 hydroxyl groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sorbitol, 2-hydroxymethyl-2- methyl-1,3-propanediol-(trimethylolethane), 2-hydroxymethyl-2-ethyl 1,3-propanediol (trimethylpropane), 1,2,4-hexanetriol, and the like.

The esters of this invention may be prepared by one of several methods. The method which is preferred because of convenience and superior properties of the esters it produces, involves the reaction of a suitable alcohol with a substantially hydrocarbon-substituted succinic anhydride. The esterification is usually carried out at a temperature above about 100° C., preferably between 150° C. and 300° C.

The water formed as a by-product is removed by distillation as the esterification proceeds. A solvent may be used in the esterification to facilitate mixing and temperature control. It also facilitates the removal of water from the reaction mixture. The useful solvents include xylene, toluene, diphenyl ether, chlorobenzene, and mineral oil. The esterification is illustrated by the reaction of ethylene glycol with a substituted succinic anhydride as represented by the equations below.

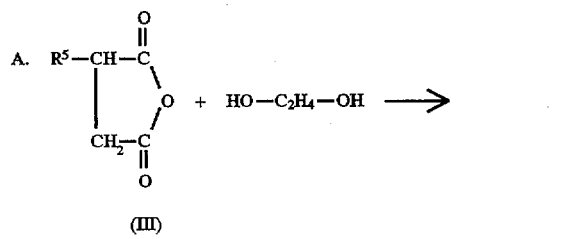

(III)

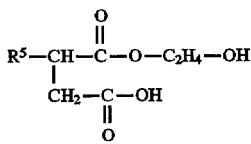

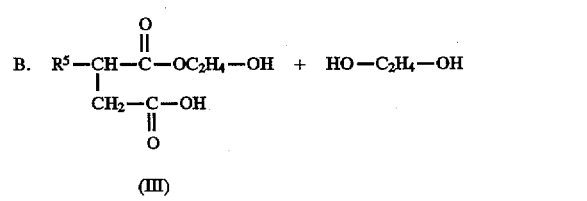

(III)

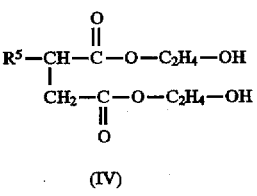

(IV)

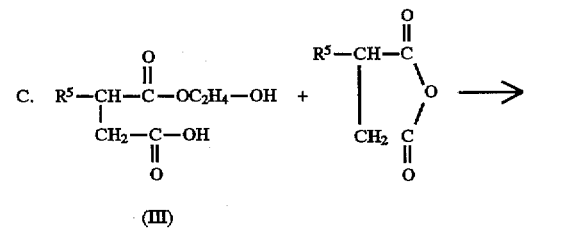

(III)

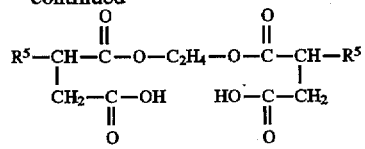

(V)

wherein R is a substantially hydrocarbon radical having at least about 50 aliphatic carbon atoms. It will be readily appreciated that the above equations are merely illustrative. Other products not represented by Formulas III, IV and V may be formed. Polymeric esters formed by the condensation of two or more molecules of each of the succinic acid reactant and the polyhydric alcohol reactant likewise may be formed. In most cases the product is a mixture of esters, the precise chemical composition and the relative proportions of which in the product are difficult to determine. Consequently, the product of such reaction is best described in terms of the process by which it is formed.

A modification of the above process involves the replacement of the substituted succinic anhydride with the corresponding succinic acid. However, succinic acids readily undergo dehydration at temperatures above about 100° C. and are thus converted to their anhydrides which are then esterified by the reaction with the alcohol reactant. In this regard, succinic acids appear to be the substantial equivalent of their anhydrides in the process.

The relative proportions of the succinic reactant and the hydroxy reactant which are to be used depend to a large measure upon the type of product desired and the number of hydroxyl groups present in the molecule of the hydroxy reactant. For instance, the formation of a half ester of a succinic acid, i.e., one in which only one of the two acid radicals is esterified, involves the use of one mole of a monohydric alcohol for each mole of the substituted succinic acid reactant, whereas the formation of a diester of a succinic acid involves the use of two moles of the alcohol for each mole of the acid. On the other hand, one mole of a hexahydric alcohol may combine with as many as six moles of a succinic acid to form an ester in which each of the six hydroxyl radicals of the alcohol is esterified with one of the two acid radicals of the succinic acid. Thus, the maximum proportion of the succinic acid to be used with a polyhydric alcohol is determined by the number of hydroxyl groups present in the molecule of the hydroxy reactant. For the purposes of this invention, it has been found that esters obtained by the reaction of equi-molar amounts of the succinic acid reactant and hydroxy reactant have superior properties and are therefore preferred.

In some instances it is advantageous to carry out the esterification in the presence of a catalyst such as sulfuric acid, pyridine hydrochloride, hydrochloric acid, benzene sulfonic acid, p-toluene sulfonic acid, phosphoric acid, or any other known esterification catalyst. The amount of the catalyst in the reaction may be as little as 0.01% (by weight of the reaction mixture), more often from about 0.1% to about 5%.

The following examples illustrate the preparation of the polyolefin esters.

EXAMPLE C-3

A substantially hydrocarbon-substituted succinic anhydride is prepared by chlorinating a polyisobutene having a molecular weight of 1000 to a chlorine content of 4.5% and then heating the chlorinated polyisobutene with 1.2 molar proportions of maleic anhydride at a temperature of 150°–220° C. The succinic anhydride thus obtained has an acid number of 130. A mixture of 874 grams (1 mole) of the succinic anhydride and 104 grams (1 mole) of neopentyl glycol is mixed at 240° C.–250° C./30 mm. for 12 hours. The residue is a mixture of the esters resulting from the esterification of one and both hydroxy radicals of the glycol. It has a saponification number of 101 and an alcoholic hydroxyl content of 0.2%.

Example C-4

A mixture of 926 grams of a polyisobutene-substituted succinic anhydride having an acid number of 121, 1023 grams of mineral oil, and 124 grams (2 moles per mole of the anhydride) of ethylene glycol is heated at 50°–170° C. while hydrogen chloride is bubbled through the reaction mixture for 1.5 hours. The mixture is then heated to 250° C./30 mm. and the residue is purified by washing with aqueous sodium hydroxide followed by washing with water, then dried and filtered. The filtrate is 50% oil solution of an ester having a saponification number of 48.

EXAMPLE C-5

A mixture of 438 grams of the polyisobutene-substituted succinic anhydride prepared as is described in Example C-3 and 333 grams of a commercial polybutylene glycol having a molecular weight of 1000 is heated for 10 hours at 150°–160° C. The residue is an ester having a saponification number of 73 and an alcoholic hydroxyl content of 0.7%.

EXAMPLE C-6

A mixture of 456 grams of a polyisobutene-substituted succinic anhydride prepared as is described in Example C-3 and 350 grams (0.35 mole) of the monophenyl ether of a polyethylene glycol having a molecular weight of 1000 is heated at 150°–155° C. for 2 hours. The product is an ester having a saponification number of 71, an acid number of 53, and an alcoholic hydroxyl content of 0.52%.

The third emulsifier comprises the coupling of two different acylating agents. A high molecular weight acylating agent and a low molecular weight acylating agent are coupled together to form an intermediate. The intermediate is reacted with an amine to form the desired emulsifier.

The high molecular weight acylating agent (a) is of the formula

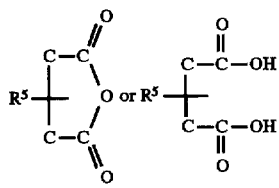

This acylating agent (a) is defined above with the polyolefin amine/ester salts and the polyolefin ester.

The high molecular weight acylating agent (a) is coupled with a low molecular weight acylating agent (d) of the formula

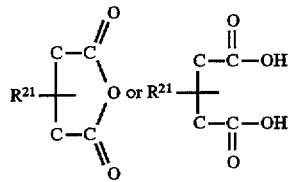

wherein $R^{21}$ is a hydrocarbyl group that contains from 1 up to 18 carbon atoms. Preferably $R^{21}$ is an aliphatic or alicyclic hydrocarbyl group with less than 10% of its carbon-to-carbon bonds being unsaturated. $R^{21}$ can be derived from olefins of from 2 to about 18 carbon atoms with alpha-olefins being particularly useful. Examples of such olefins include ethylene, propylene, 1-butene, isobutene, 1-pentene, 2-methyl-1-butene, 3-methyl-1-butene, 1-hexene, 1-heptene, 1-octane, styrene, 1-nonene, 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha olefins, $C_{12-16}$ alpha olefins, $C_{14-16}$ alpha olefins, $C_{14-18}$ alpha olefins, $C_{16-18}$ alpha olefins, etc. are particularly useful; these commercial alpha olefin fractions also usually include minor amounts of alpha olefins outside the given ranges. The production of such substituted succinic acids and their derivatives is well known to those of skill in the art and need not be discussed in detail herein.

Coupling Components:

The coupling component (e) acts as a bridge between the low and the high molecular weight succinic acid molecules. The low and high molecular weight molecules may be mixed together, and are reacted with the coupling component. All possible linked products are formed, that is, the product in which a coupling, or bridging component acts as a bridge between a low and a high molecular weight species, the product in which a coupling components as a bridge between two low molecular weight succinic agents and the product in which a coupling component acts as a bridge between two high molecular weight succinic agents. The coupling component may be any compound having (i) two or more primary amino groups, (ii) two or more secondary amino groups, (iii) at least one primary amino group and at least one secondary group, (iv) at least two hydroxyl groups, or (v) at least one primary or secondary amino group and at least one hydroxyl group. These include the polyamines, polyols and hydroxyamines disclosed above as co-reactants.

Polyamines Useful as Coupling Components

The polyamines useful as coupling compounds are characterized by the presence within their structure of at least two —$NH_2$ groups, at least two >NH groups, or at least one —$NH_2$ group and at least one >NH group.

These polyamines may be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These mines may be saturated or unsaturated. The amines may also contain non-hydrocarbon substituents or groups as long as these groups do not significantly interfere with the reaction of such amines with the high molecular weight and low molecular weight acylating agents. Such non-hydrocarbon substituents or groups include lower alkoxy, lower alkyl, mercapto, nitro, and interrupting groups such as —O— and —S— (e.g., as in such groups as

—CH$_2$CH$_2$—X—CH$_2$CH$_2$ where X is —O— or —S—).

The polyamines include aliphatic, cycloaliphatic and aromatic polyamines analogous to the aliphatic, cycloaliphatic and aromatic monoamines described below except for the presence within their structure of at least one additional >NH or —NH$_2$ group. Suitable polyamines may be readily selected, by those skilled in the art from the poly-amine co-reactants discussed above.

Polyols Useful as Coupling Components

The polyols or polyhydric alcohols useful as coupling components include those polyols disclosed above as $R^9(OH)_m$ for use in preparing the polyolefin esters. Alkylene glycols, polyoxyalkylene glycols, are particularly useful.

Hydroxyamines Useful as Coupling Components

The hydroxyamines useful as coupling molecules may be primary or secondary amines. They may also be tertiary mines provided said tertiary mines also contain at least two hydroxyl groups. These hydroxyamines contain at least two >NH, at least two NH$_2$ groups, at least one —OH group and at least one >NH or —NH$_2$ group, or at least two —OH groups. The terms "hydroxyamine" and aminoalcohol" describe the same class of compounds and, therefore, may be used interchangeably. Such hydroxyamines may be readily selected, by those skilled in the art from the alkanol amines disclosed as co-reactants for use in preparing the emulsifiers useful in the present invention.

After the intermediate is formed, the emulsifier is formed by reacting the intermediate with an amine (f). The amines that function as (f) include ammonia, and the primary amines, secondary amines and hydroxyamines discussed above as being useful as the coupling component (e). In addition to ammonia, the primary amines, secondary amines and hydroxyamines discussed above, the amines (f) also include primary and secondary monoamines, and tertiary mono- and polyamines. The primary and secondary monoamines are described above under the subtitle "Polyamines Useful as Coupling Molecules" as being analogues of the polyamines described above. These primary and secondary monoamines include the aliphatic, cycloaliphatic and aromatic monoamines discussed above. The tertiary amines are analogous to the primary amines, secondary amines and hydroxyamines discussed above with the exception that they can be either monoamines or polyamines and the hydrogen atoms in the H—N< or —NH$_2$ groups are replaced by hydrocarbyl groups.

The tertiary mines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic mines. These tertiary mines may be saturated or unsaturated. If unsaturated, the amine is preferably free from acetylenic unsaturation. The tertiary mines may also contain non-hydrocarbon substituents or groups as long as these groups do not significantly interfere with the reaction of the high molecular weight and low molecular weight acylating agents. Such non-hydrocarbon substituents or groups include lower alkoxy, lower alkyl, mercapto, nitro, and interrupting groups such as —O— and —S— (e.g., as in such groups as —CH$_2$CS$_2$—X—CH$_2$CH$_2$ where X is —O— or —S—).

The monoamines can be represented by the formula

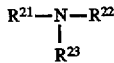

wherein $R^{21}$, $R^{22}$, and $R^{23}$ are the same or different hydrocarbyl groups. Preferably, $R^{21}$, $R^{22}$ and $R^{23}$ are independently hydrocarbyl groups of from 1 to about 20 carbon atoms.

Examples of useful tertiary mines include trimethyl amine, triethyl mine, tripropyl amine, tributyl amine, monomethyldiethylamine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyphenyl amine, N,N-dioctyl-1-octanamine, N,N-didodecyl-1-dodecanamine tricoco amine, trihydrogenated-tallow amine, N-methyl-dihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcocoamine, N,N-dimethylsoyaamine, N,N-dimethylhydrogenated tallow amine, etc.

Useful tertiary alkanol amines are represented by the formula

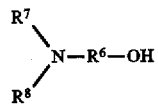

and are described above as (b) in the first emulsifier disclosure.

Useful polyamines include the alkylene polyamines discussed above as well as alkylene polyamines with only one or no hydrogens attached to the nitrogen atoms. Thus, the alkylene polyamines include those conforming to the formula:

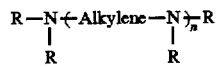

wherein n is from 1 to about 10, preferably from 1 to about 7; each R is independently a hydrogen atom, a hydrocarbyl group or a hydroxy-substituted hydrocarbyl group having up to about 700 carbon atoms; preferably up to about 100 carbon atoms, more preferably up to about 50 carbon atoms, more preferably up to about 30 carbon atoms; and the "Alkylene" group has from 1 to about 18 carbon atoms, preferably from 1 to about 4 carbon atoms, with the preferred Alkylene being ethylene or propylene.

The third emulsifier can be prepared by initially reacting the high and low molecular weight acylating agents with the coupling component (e) to form an intermediate, and thereafter reacting said intermediate with amine (f) to form the desired emulsifier which is a salt.

The ratio of reactants utilized in the preparation of the third emulsifier may be varied over a wide range. Generally, for each equivalent of each of the high and low molecular weight acylating agents, at least about 0.5 equivalents of coupling component (e) is used. From about 0.1 to about 2 equivalents or more of amine (f) are used for each equivalent of the high and low molecular weight acylating agents, respectively. The upper limit of coupling component (e) is about 2 equivalents of coupling component (e) for each equivalent of high molecular weight acylating agent, and about 2 equivalents of coupling component (e) for each equivalent of low molecular weight acylating agents. Generally the ratio of equivalents of high to low molecular weight acylating agents is about 0.5 to about 2, with about 1:1 being preferred. Preferred mounts of the reactants are about 2 equivalents of the coupling component (e) and from about 0.1 to about 2 equivalents of amine (f) for each equivalent of each of the high and the low molecular weight acylating agents.

The number of equivalents of the high and the low molecular weight acylating agents depends on the total number of carboxylic functions present in each. In determining the number of equivalents for each of the high and the low molecular weight acylating agents, those carboxyl functions which are not capable of reacting as a carboxylic acid acylating agent are excluded. In general, however there is one equivalent of the high molecular weight acylating agent and low molecular weight acylating agent for each carboxy group in these acylating agents. For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of each of the high and the low molecular weigh acylating agents can be readily determined by one skilled in the art.

An equivalent weight of a polyamine is the molecular weight of the polyamine divided by the total number of nitrogens present in the molecule. If the polyamine is to be used as coupling component (e), tertiary amino groups are not counted. On the other hand, if the polyamine is to be used as amine (f), tertiary amino groups are counted. Thus, ethylene diamine has an equivalent weight equal to one-half of its molecular weight; diethylene triamine has an equivalent weight equal to one-third its molecular weight. The equivalent weight of a commercially available mixture of polyalkylene polyamine can be determined by dividing the atomic weight of nitrogen (14) by the % N contained in the polyamine; thus, a polyamine mixture having a % N of 34 would have an equivalent weight of 41.2. An equivalent weight of ammonia or a monoamine is its molecular weight.

An equivalent weight of polyhydric alcohol is its molecular weight divided by the total number of hydroxyl groups present in the molecule. Thus, an equivalent weight of ethylene glycol is one-half its molecular weight.

An equivalent weight of a hydroxyamine which is to be used as coupling component (e) is its molecular weight divided by the total number of —OH, >NH and —NH$_2$ groups present in the molecule. Thus, methylethanolamine when used as coupling component (e) has an equivalent weight equal to one-half its molecular weight. On the other hand, if the hydroxyamine is to be used as amine (f), an equivalent weight thereof would be its molecular weight divided by the total number of nitrogen groups present in the molecule. Thus, methylethanolamine, when used as amine (f), would have an equivalent weight equal to its molecular weight; ethanolamine would also have an equivalent weight equal to its molecular weight.

The high and low molecular weight acylating agents can be reacted with coupling component (e) according to conventional ester- and/or amide-forming techniques. This normally involves heating the high and low molecular weigh acylating agents with coupling component (e), optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., more preferably about 80° C. to about 100° C. when the high and low molecular weight acylating agents are anhydrides. On the other hand, when the high and low molecular weight acylating agents are acids, this temperature is preferably in the range of about 100° C. to about 300° C. with temperatures in the range of about 125° C. to about 250° C. often being employed.

The following are specific examples of the preparation of the third emulsifier.

EXAMPLE C-7

1120 parts of polyisobutylene (number average molecular weight=950) substituted succinic anhydride and 325 parts of a low molecular weight hydrocarbyl-substituted succinic anhydride derived from one mole of a $C_{16}$ alpha-olefin and one mole of maleic anhydride are heated to a temperature of 93° C. with stirring and maintained at that temperature for one hour. 62 parts of ethylene glycol are added to the mixture. The mixture is maintained at a temperature of 93°–105° C. for 2 hours. 178 parts of dimethylethanolamine are added to the mixture over a period of 0.5 hour. The mixture is maintained at 93°–104° C. for 2.5 hours then cooled to 70° C. to provide the desired product.

Example C-8

1370 parts of polyisobutylene (number average molecular weight=1200), substituted succinic anhydride, 260 parts of a low molecular weight hydrocarbyl-substituted succinic anhydride derived from one mole of a $C_{12}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE C-9

1120 parts of the polyisobutylene substituted succinic anhydride identified in Example 1, 260 parts of a low molecular weight hydrocarbyl-substituted succinic anhydride derived from one mole of a $C_{12}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE C-10

1370 parts of the polyisobutylene substituted succinic anhydride identified in Example 2, 325 parts of a low molecular weight hydrocarbyl-substituted succinic anhydride derived from one mole of a $C_{16}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE C-11

1120 parts of the polyisobutylene substituted succinic anhydride identified in Example 1, 325 parts of a low molecular weight hydrocarbyl-substituted succinic anhydride derived from one mole of a $C_{16}$ alpha-olefin and one mole of maleic anhydride, and 75 parts of N-methylethanolamine are reacted under ester-amide-forming conditions to form an intermediate product. 298 parts of triethanolamine are reacted with the intermediate product under salt-forming conditions to form a desired salt composition.

(D) The Sulfurized Composition

Three different types of sulfurized compositions are envisioned within this invention. The sulfurized compositions are two different types of sulfurized olefinic hydrocarbons and a sulfurized mixture of a triglyceride, a carboxylic acid and an olefin.

The first sulfurized olefinic hydrocarbon comprises the reaction product of sulfur and a Diels-Alder adduct. The Diels-Alder adducts are a well known, art-recognized class of compounds prepared by the diene synthesis or Diels-Alder reaction. A summary of the prior art relating to this class of compounds is found in the Russian monograph, *Dienovyi Sintes*, Izdatelstwo Akademii Nauk SSSR, 1963 by A. S. Onischenko. (Translated into the English language by L. Mandel as A. S. Onischenko, *Diene Synthesis*, N.Y., Daniel Davey and Co., Inc., 1964). This monograph and references cited therein are incorporated by reference into the present specification.

Basically, the diene synthesis (Diels-Alder reaction) involves the reaction of at least one conjugated diene, >C=C—C=,C<, with at least one ethylenically or acetylenically unsaturated compound, >C=C<, these latter compounds being known as dienophiles. The reaction can be represented as follows:

Reaction 1:

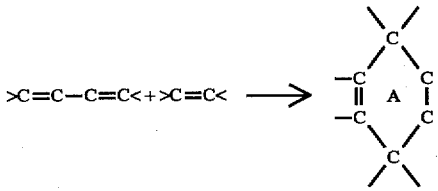

Reaction 2:

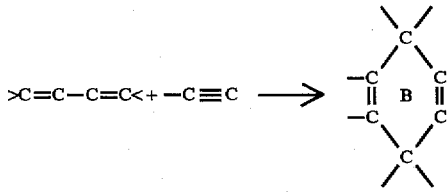

The products, A and B are commonly referred to as Diels-Alder adducts. It is these adducts which are used as starting materials for the preparation of the first sulfurized composition.

Representative examples of such 1,3-dienes include aliphatic conjugated diolefins or dienes of the formula

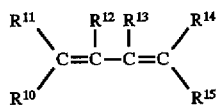

wherein $R^{10}$ through $R^{15}$ are each independently selected from the group consisting of hydrogen, alkyl, halo, alkoxy, alkenyl, alkenyloxy, carboxy, cyano, amino, alkylamino, dialkylamino, phenyl, and phenyl-substituted with 1 to 3 substituents corresponding to $R^{10}$ through $R^{15}$ with the proviso that a pair of R's on adjacent carbons do not form an additional double bond in the diene. Preferably not more than three of the R variables are other than hydrogen and at least one is hydrogen. Normally the total carbon content of the diene will not exceed 20. In one preferred aspect of the invention, adducts are used where $R^{12}$ and $R^{13}$ are both hydrogen and at least one of the remaining R variables is also hydrogen. Preferably, the carbon content of these R variables when other than hydrogen is 7 or less. In this most preferred class, those dienes where $R^{10}$, $R^{11}$, $R^{14}$ and $R^{15}$ are hydrogen, chloro, or lower alkyl are especially useful. Specific examples of the R variables include the following groups: methyl, ethyl, phenyl, HOOC—, N=C—, $CH_3COO$—, $CH_3CH_2O$—, $CH_3C(O)$—, HC(O), —Cl, —Br, tert-butyl, $CF_3$, tolyl, etc. Piperylene, isoprene, methylisoprene, chloroprene, and 1,3-butadiene are among the preferred dienes for use in preparing the Diels-Alder adducts.

The dienophiles suitable for reacting with the above dienes to form the adducts used as reactants can be represented by the formula

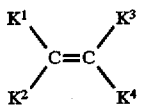

wherein the K variables are the same as the R variables in the diene formula above.

A preferred class of dienophiles are those wherein at least one of the K variables is selected from the class of electron-accepting groups such as formyl, cyano, nitro, carboxy, carbohydrocarbyloxy, hydrocarbylcarbonyl, hydrocarbylsulfonyl, carbamyl, acylcarbanyl, N-acyl-N-hydrocarbylcarbamyl, N-hydrocarbylcarbamyl, and N,N-dihydrocarbylcarbamyl. Those K variables which are not electron-accepting groups are hydrogen, hydrocarbyl, or substituted-hydrocarbyl groups. Usually the hydrocarbyl and substituted hydrocarbyl groups will not contain more than 10 atoms each.

The hydrocarbyl groups present as N-hydrocarbyl substituents are preferably alkyl of 1 to 30 carbon atoms and especially 1 to 10 carbon atoms. Representative of this class of dienophiles are the following: nitroalkenes, e.g., 1-nitrobutene-1, 1-nitropentene-1, 3-methyl-1-nitro-butene-1, 1-nitroheptene-1, 1-nitrooctene-1, 4-ethoxy-1-nitrobutene-1; alpha, beta-ethylenically unsaturated aliphatic carboxylic acid esters, e.g., alkylacrylates and alpha-methyl alkylacrylates (i.e., alkyl methacrylates) such as butylacrylate and butylmethacrylate, decyl acrylate and decylmethacrylate, di-(n-butyl)-maleate, di-(t-butyl-maleate); acrylonitrile, methacrylonitrile, beta-nitrostyrene, methylvinyl-sulfone, acrolein, acrylic acid; alpha, beta-ethylenically unsaturated aliphatic carboxylic acid amides, e.g., acrylamide, N,N-dibutylacrylamide, methacrylamide, N-dodecylmethacrylamide, N-penyylcrotonamide; crotonaldehyde, crotonic acid, beta, beta-dimethyldivinylketone, methyl-vinyl-ketone, N-vinyl pyrrolidone, alkenyl halides, and the like.

One preferred class of dienophiles are those wherein at least one, but not more than two of K variables is —C(O)O—R° where R° is the residue of a saturated aliphatic alcohol of up to about 40 carbon atoms; e.g., for example at least one K is carbohydrocarbyloxy such as carboethoxy, carbobutoxy, etc., the aliphatic alcohol from which —R° is derived can be a mono- or polyhydric alcohol such as alkyleneglycols, alkanols, aminoalkanols, alkoxy-substituted alkanols, ethanol, ethoxy ethanol, propanol, beta-diethylaminoethanol, dodecyl alcohol, diethylene glycol, tripropylene glycol, tetrabutylene glycol, hexanol, octanol, isooctyl alcohol, and the like. In this especially preferred class of dienophiles, not more than two K variables will be —C(O)—O—R° groups and the remaining K variables will be hydrogen or lower alkyl, e.g., methyl, ethyl, propyl, isopropyl, and the like.

Specific examples of dienophiles of the type discussed above are those wherein at least one of the K variables is one of the following groups: hydrogen, methyl, ethyl, phenyl, HOOC—, HC(O)—, CH$_2$=CH—, HC≡C—, CH$_3$C(O))—, ClCH$_2$—, HOCH$_2$—, alpha-pyridyl, —NO$_2$, —Cl, —Br, propyl, iso-butyl, etc.

In addition to the ethylenically unsaturated dienophiles, there are many useful acetylenically unsaturated dienophiles such as propiolaldehyde, methylethynylketone, propylethynylketone, propenylethynylketone, propiolic acid, propiolic acid nitrile, ethylpropiolate, tetrolic acid, propargylaldehyde, acetylenedicarboxylic acid, the dimethyl ester of acetylenedicarboxylic acid, dibenzoylacetylene, and the like.

The first sulfurized compositions are readily prepared by heating a mixture of sulfur and at least one of the Diels-Alder adducts of the types discussed hereinabove at a temperature within the range of from about 100° C. to about 200° C. will normally be used. This reaction results in a mixture of products, some of which have been identified. In the compounds of know structure, the reacts with the substituted unsaturated cycloaliphatic reactants at a double bond in the nucleus of the unsaturated reactant.

The molar ratio of sulfur to Diels-Alder adduct used in the preparation of this sulfur-containing composition is from about 1:2 up to about 4:1. Generally, the molar ratio of sulfur to Diels-Alder adduct will be from about 1:1 to about 4:1 and preferably about 2:1 to about 4:1.

The reaction can be conducted in the presence of suitable inert organic solvents such as mineral oils, alkanes of 7 to 18 carbons, etc., although no solvent is generally necessary. After completion of the reaction, the reaction mass can be filtered and/or subjected to other conventional purification techniques. There is no need to separate the various sulfur-containing products as they can be employed in the form of a reaction mixture comprising the compounds of known and unknown structure.

As hydrogen sulfide is an undesirable contaminant, it is advantageous to employ standard procedures for assisting in the removal of the H$_2$S from the products. Blowing with steam, alcohols, air, or nitrogen gas assists in the removal of H$_2$S as does heating at reduced pressures with or without the blowing.

It is sometimes advantageous to incorporate materials useful as sulfurization catalysts in the reaction mixture. These materials may be acidic, basic or neutral. Useful neutral and acidic materials include acidified clays such as "Super Filtrol", p-toluenesulfonic acid, dialkylphosphorodithioic acids, phosphorus sulfides such as phosphorus pentasulfide and phosphites such as triaryl phosphites (e.g., triphenyl phosphite).

The basic materials may be inorganic oxides and salts such as sodium hydroxide, calcium oxide and sodium sulfide. The most desirable basic catalysts, however, are nitrogen bases including ammonia and amines. The amines include primary, secondary and tertiary hydrocarbyl amines wherein the hydrocarbyl radicals are alkyl, aryl, aralkyl, alkaryl or the like and contain about 1-20 carbon atoms. Suitable amines include aniline, benzylamine, dibenzylamine, dodecylamine, naphthylamine, tallow amines, N-ethyl-dipropylamine, N-phenylbenzylamine, N,N-diethylbutylamine, m-toluidine and 2,3-xylidine. Also useful are heterocyclic amines such as prrolidine, N-methylpyrrolidine, piperidine, pyridine and quinoline.

The preferred basic catalysts include ammonia and primary, secondary or tertiary alkylamines having about 1-8 carbon atoms in the alkyl radicals. Representing amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used, as well as mixtures of ammonia and amines.

When a catalyst is used, the amount is generally about 0.05–2.0% of the weight of the adduct.

The following example illustrates the preparation of the first sulfurized composition. Unless otherwise indicated in these examples and in other parts of this specification, as well as in the appended claims, all parts and percentages are by weight.

EXAMPLE D-1

A mixture comprising 400 parts of toluene and 66.7 parts of aluminum chloride is charged to a two-liter flask fined with a stirrer, nitrogen inlet tube, and a solid carbon dioxide-cooled reflux condenser. A second mixture comprising 640 parts (5 moles) of butyl acrylate and 240.8 parts of toluene is added to the AlCl$_3$ slurry while maintaining the temperature within the range of 37°–58° C. over a 0.25-hour period. Thereafter, 270 parts (5 moles) of butadiene is added to the slurry over a 2.75-hour period while maintaining the temperature of the reaction mass at 50°–61° C. by means of external cooling. The reaction mass is blown with nitrogen for about 0.33 hour and then transferred to a four-liter separatory funnel and washed with a solution of 150 parts of concentrated hydrochloric acid in 1100 parts of water. Thereafter, the product is subjected to two additional water washings using 1000 parts of water for each wash. The washed reaction product is subsequently distilled to remove unreacted butyl acrylate and toluene. The residue of this first distillation step is subjected to further distillation at a pressure of 9–10 millimeters of mercury whereupon 785 parts of the desired product is collected over the temperature of 105°–115° C.

A mixture of 728 parts (4.0 moles) of the above material, 218 parts (6.8 moles) of sulfur, and 7 parts of triphenyl phosphite is prepared and heated with stirring to a temperature of about 181 ° C. over a period of 1.3 hours. The mixture is maintained under a nitrogen purge at a temperature of 181°–187° C. for 3 hours. After allowing the material to cool to about 85° C. over a period of 1.4 hours, the mixture is filtered using a filter aid, and the filtrate is the desired second sulfurized composition containing 23.1% sulfur.

The second sulfurized olefinic hydrocarbons are at least one sulfurization product of an aliphatic, arylaliphatic or alicylic olefinic hydrocarbon containing from about 3 to about 30 carbon atoms.

The olefinic hydrocarbons contain at least one olefinic double bond, which is defined as a nonaromatic double bond. In its broadest sense, the olefinic hydrocarbon may be defined by the formula $R^{16}R^{17}$=$CR^{18}R^{19}$, wherein $R^{18}$ and $R^{19}$ are hydrogen and $R^{16}$ and $R^{17}$ are alkyl (that is, the olefin is aliphatic). Olefinic compounds having about 3–30 and especially about 3–16 carbon atoms are particularly desirable.

Propylene, isobutene and their dimers, trimers and tetramers, and mixtures thereof are especially preferred olefinic compounds. Of these compounds, isobutene and diisobutene are particularly desirable. The sulfurizing reagent used is a mixture of hydrogen sulfide and sulfur.

The amounts of sulfur and hydrogen sulfide per mole of olefinic compound are, respectively, usually about 0.1–1.5 moles. The preferred ranges are about 0.4–1.25 moles respectively, and the most desirable ranges are about 0.4–0.8 mole respectively.

The temperature range in which the sulfurization reaction is carded out is generally about 50°–350° C. The preferred range is about 100°–200° C., with about 125°–180° C., being especially suitable. The reaction is often preferably conducted under superatmospheric pressure; this may be and usually is autogenous pressure (i.e., the pressure which naturally develops during the course of the reaction) but may also be externally applied pressure. The exact pressure may vary during the course of this reaction.

It is frequently advantageous to incorporate materials useful as sulfurization catalysts in the reaction mixture. These materials may be acidic, basic or neutral, but are preferably basic materials, especially nitrogen bases including ammonia and amines, most often alkylamines especially n-butyl amine. The amount of catalyst used is generally about 0.05–2.0% of the weight of the olefinic compound.

Following the preparation of the sulfurized mixture, it is preferred to remove substantially all low boiling materials, including unreacted monoolefin, mercaptan and monosulfide, typically by venting the reaction vessel or by distillation at atmospheric pressure, vacuum distillation or stripping, or passage of an inert gas such as nitrogen through the mixture at a suitable temperature and pressure.

A further optional step in the preparation of sulfurized olefinic hydrocarbons is the treatment of the sulfurized product, obtained as described hereinabove, to reduce active sulfur. An illustrative method is treatment with an alkali metal sulfide. Other optional treatments may be employed to remove insoluble byproducts and improve such qualities as the odor, color and staining characteristics of the sulfurized compositions.

U.S. Pat. No. 4,119,549 is incorporated by reference herein for its disclosure of suitable sulfurized olefinic hydrocarbons and procedures to prepare them. Several specific sulfurized compositions are described in the working examples thereof. The following examples illustrate the preparation of two such compositions.

EXAMPLE D-2

Charge sulfur (629 parts, 19.6 moles) to a jacketed high pressure reactor fitted with an agitator and internal cooling oils. Circulate refrigerated brine through the coils to cool the reactor prior to the introduction of the gaseous reactants. After sealing the reactor, evacuating to about 6 torr and cooling, charge 550 parts (19.6 moles) of isobutene, 334 parts (9.8 moles) of hydrogen sulfide and 7 parts of n-butylamine are charged to the reactor. Heat the reactor, using steam in the external jacket, to a temperature of about 171° C. over about 1.5 hours. A maximum pressure of 720 psig. may be reached at about 138° C. during this heat-up. Prior to reaching the peak reaction temperature, the pressure should start to decrease and continue to decrease steadily as the gaseous reactants are consumed. After about 4.75 hours at 171° C., the unreacted hydrogen sulfide and isobutene is vented to a recovery system. After the pressure in the reactor has decreased to atmospheric, recover the sulfurized product as a liquid.

EXAMPLE D-3

Following substantially the procedure of Example D-1, react 773 parts of diisobutene with 428.6 parts of sulfur and 143.6 parts of hydrogen sulfide in the presence of 2.6 parts of n-butylamine, under autogenous pressure at a temperature of about 150°–155° C. Remove volatile materials and recover the sulfurized product as a liquid.

A further discussion of the sulfurized olefinic hydrocarbons occurs in U.S. Pat. No. 4,560,488, which is hereby incorporated by reference for its disclosure of the sulfurized olefins and procedures for making them.

The final sulfurized composition is prepared by sulfurizing a mixture comprising three essential reagents. This first reagent is a fatty oil; that is, at least one naturally occurring ester of glycerol and a fatty acid, or a synthetic ester of similar structure. Such fatty oils are animal or vegetable oil tryiglycerides of the formula

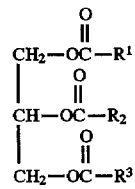

wherein $R^1$, $R^2$ and $R^3$ are aliphatic groups containing from about 7 to about 23 carbon atoms. A non-exhaustive list of triglycerides include peanut oil, cottonseed oil, soybean oil, sunflower oil, rapeseed oil, safflower oil and corn oil. These triglycerides are the same as component (A) disclosed above.

The second regent is at least one alkenyl carboxylic acid of the formula $R^{20}COOH$ wherein $R^{20}$ contains about 7 to about 29 carbon atoms. The carboxylic acids are ordinarily free from acetylenic unsaturation. Suitable acids include (preferably) oleic acid, linoleic acid, linolenic acid, 14-hydroxy-11-eicosenoic acid and ricinoleic acid. In particular, the carboxylic acid may be an unsaturated fatty acid such as oleic or linoleic acid, and may be a mixture of acids such as is obtained from tall oil or by the hydrolysis of peanut oil, soybean oil or the like. The amount of carboxylic acid used is about 2–50 parts by weight per 100 parts of triglyceride; about 2–8 parts by weight is preferred.

The third reagent is at least one substantially aliphatic monoolefin containing from about 4 to about 36 carbon atoms, and is present in the amount of about 25–400 parts by weight per 1000 parts of triglyceride. Suitable olefins include the octenes, decenes, dodecencs, eicosenes and triacontenes, as well as analogous compounds containing aromatic or non-hydrocarbon substituents which are substantially inert in the context of this invention. (As used in the specification and appended claims, the term "substantially inert" when used to refer to solvents, diluents, substituents and the like is intended to mean that the solvent, diluent, substituent, etc. is inert to chemical or physical change under the conditions which it is used so as not to interfere materially in an adverse manner with the preparation, storage, blending and/or functioning of the composition, additive, compound, etc. in the context of its intended use). For example, small amounts of a solvent, diluent, substituent, etc. can undergo minimal reaction or degradation without preventing the making and using of this component as described herein. In other words, such reaction or degradation, while technically discernible, would not be sufficient to deter a worker of ordinary skill in the art from making and using this component for its intended purposes. "Substantially inert" as used herein is, thus, readily understood and appreciated by those of ordinary skill in the art. Terminal olefins, or α-olefins, are preferred, especially those containing from about 12 to about 20 carbon atoms. Especially preferred are straight chain a olefins. Mixtures of these olefins are commercially available and such mixtures are contemplated for use in this invention.

This sulfurized composition is prepared by reacting a mixture comprising a triglyceride, a fatty acid and an aliphatic monoolefin with a sulfurizing agent at a temperature between about 100° C. and about 250° C., usually between about 150° and about 210° C. The sulfurizing reagent may be, for example, sulfur, a sulfur halide such as sulfur monochloride or sulfur dichloride, a mixture of hydrogen sulfide and sulfur dioxide, or the like. Elemental sulfur is often preferred and the invention especially contemplates the use of sulfurized composition prepared by reacting sulfur with the aforesaid mixture. The weight ratio of the combination of triglyceride, fatty acid and aliphatic monoolefin to sulfur is between about 5:1 and about 15:1, generally between about 5:1 and about 10:1.

In addition to the above described reagents, the reaction mixture may contain other materials. These may include, for example, sulfurization promoters, typically phosphorus-containing reagents such as phosphorous acid esters such as lecithin.

The sulfurization reaction is effected by merely heating the reagents at the temperature indicated above, usually with efficient agitation and in an inert atmosphere (e.g., nitrogen). If any of the reagents, especially the aliphatic monoolefin, are appreciably volatile at the reaction temperature, the reaction vessel may be maintained under pressure. It is frequently advantageous to add sulfur portionwise to the mixture of the other reagents. While it is usually preferred of the reagent previously described, the reaction may also be effected in the presence of a substantially inert organic diluent (e.g., an alcohol, ether, ester, aliphatic hydrocarbon, halogenated aromatic hydrocarbon or the like) which is liquid within the temperature range employed. When the reaction temperature is relatively high, e.g., about 200° C., there may be some evolution of sulfur from the product which is avoided if a lower reaction temperature (e.g., from about 150° to about 170° C.) is used. However, the reaction sometimes requires a longer time at lower temperatures and an adequate sulfur content is usually obtained when the temperature is at the high end of the recited range.

Following the reaction, volatile materials may be removed by blowing with air or nitrogen and insoluble by products by filtration, usually at an elevated temperature (from about 80° to about 120° C.). The filtrate is the desired sulfur product.

U.S. Pat. Nos. 3,926,822 and 3,953,347 are incorporated by reference herein for their disclosures of a suitable sulfurized mixture of triglyceride, carboxylic acid and aliphatic monoolefin. Several specific sulfurized compositions are described in examples 10-18 of U.S. Pat. No. 3,926,822 and 10-19 of U.S. Pat. No. 3,953,347. The following example illustrates the preparation of one such composition. (In the specification and claims, all parts and percentages are by weight unless otherwise indicated.)

EXAMPLE D-4

A mixture of 100 parts of soybean oil, 5.25 parts of tall oil acid and 44.8 parts of commercial $C_{15-18}$ straight chain α-olefins is heated to 167° C. under nitrogen, and 17.4 parts of sulfur is added. The temperature of the mixture rises to 208° C. Nitrogen is blown over the surface at 165°–200° C. for 6 hours and the mixture is then cooled to 90° C. and filtered. The filtrate is the desired product and contains 10.6% sulfur.

The compositions of the present invention may further contain (E) at least one weighting agent and/or (F) at least one clay.

(E) Weighting Agents

Weighting agents increase density of drilling muds and include galena (PbS), hematite ($Fe_2O_3$), magnetite ($Fe_3O_4$), ilmenite ($FeTiO_3$), barite ($BaSO_4$), siderite ($FeCO_3$), celestite ($SrSO_4$), dolomite ($CaMg(CO_3)_2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 900, or to about 700, or to about 600. In one embodiment, the weighting agent is present in an amount from about 300 to about 500 or about 400 pounds per barrel (PPB).

(F) Clays

The compositions may also contain commercial clays such as bentonite, attapulgite, sepiolite, montmorillonite, hectorite, saponite, and illite. Montmorillonite, bentonite and attapulgite are preferred, with mortmorillonite more preferred. These clays are ordinary water wetable clays and are not treated to covert them into organophilic clays. The clays may be present in an mount from about 1, or about 2 up to about 10, or to about 8 pounds per barrel (PPB).

The following states the ranges of components (A) to (D) in parts by weight

| Component | Generally | Preferred | Most Preferred |
|---|---|---|---|
| (A) | 20–80 | 25–70 | 30–60 |
| (B) | 1–20 | 3–20 | 5–20 |
| (C) | 5–20 | 7–18 | 12–18 |
| (D) | 10–70 | 15–50 | 20–40 |

It is understood that other components besides (A), 03), (C) and (D) may be present within the composition of this invention.

The components of this invention are blended together according to the above ranges to effect solution. Table I shows Examples 1–8 that are concentrates containing only the (A) to (D) components. In Table II Examples 1A to 5A are finished drilling fluids containing the concentrates of Examples 1 to 5 respectively at a 5 pounds per barrel (PPB) of concentrate. Examples 6A to 8A are finished drilling fluids containing the concentrates of Examples 6 to 8 respectively at an 8 PPB of concentrate.

TABLE I

| | | Components | | |
|---|---|---|---|---|
| Example | (A) | (B) | (C) | (D) |
| 1 | 53.3 parts Soybean Oil | 8.9 parts 4-methyl-2-pentanol | 17.8 parts Example C-7 | 20 parts Example D-3 |
| 2 | 53.3 parts Lard Oil | 8.9 parts 4-methyl-2-pentanol | 17.8 parts Example C-7 | 20 parts Example D-3 |
| 3 | 53.3 parts Rapeseed Oil | 8.9 parts 4-methyl-2-pentanol | 17.8 parts Example | 20 parts Example |

TABLE I-continued

| Example | (A) | (B) | (C) | (D) |
|---|---|---|---|---|
| 4 | 53.3 parts Coconut Oil | 8.9 parts 4-methyl-2-pentanol | 17.8 parts Example C-7 | 20 parts Example D-3 |
| 5 | 53.3 parts Sunyl® 80 Oil | 8.9 parts 4-methyl-2-pentanol | 17.8 parts Example C-7 | 20 parts Example D-3 |
| 6 | 40 parts Sunyl® 80 Oil | 6.7 parts 4-methyl 2-pentanol | 13.3 parts Example C-7 | 40 parts Example D-4 |
| 7 | 40 parts Sunyl® 80 Oil | 6.7 parts 4-methyl-2-pentanol | 13.3 parts Example C-7 | 40 parts Example D-3 |
| 8 | 40 parts Sunyl® 80 Oil | 6.7 parts 4-methyl-2-pentanol | 13.3 parts Example C-7 | 40 parts Example D-1 |

A baseline drilling fluid is prepared by slowly introducing 8.18 parts of bentonite clay into 79.5 parts of tap water with moderate shear using a Hamilton Beach type mixer. The bentonite clay is allowed to prehydrate for 16 hours.

To the prehydrated bentonite clay is added 0.9 parts of ferrochrome lignosulfate, 0.09 parts caustic soda (NaOH) and 13.63 parts rev dust (calcium montmorillonite clay) with moderate shear, until uniform.

In a suitable container 11.39 parts of sea salt is added to 265.15 parts of tap water and mixed until dissolved. To this saltwater solution, the above mixture consisting of: hydrated bentonite clay, ferrochrome lignosulfonate, caustic soda, and rev dust, along with 4.13 parts of additional sea salt was added. The mixture was mixed with moderate shear on a Hamilton Beach type mixer for a period of 5 minutes. A coefficient of friction value is generated for this baseline drilling fluid.

Examples 1A to 5A contain the baseline drilling fluid and 5.0 PPB of Examples 1 to 5 respectively. Coefficient of friction values are generated for Examples 1A to 5A and a percent reduction of coefficient of friction is determined. Table II summarizes the results of different natural oils (A), all at the same parts by weight in a drilling fluid and components (B), (C) and (D) are the same.

TABLE II

| Example | Base Oil | Coefficient of Friction | Percent Reduction |
|---|---|---|---|
| Baseline | None | 0.24–0.27(1) | — |
| 1A | Soybean | 0.195 | 24.8 |
| 2A | Lard | 0.171 | 36.5 |
| 3A | Rapeseed | 0.153 | 38.6 |
| 4A | Coconut | 0.212 | 15.0 |
| 5A | Sunyl 80 Oil | 0.143 | 41.2 |

Table III summarizes the results of components (A) to (D) in a drilling fluid. Component(D) is changed from example to example.

TABLE III

| Example | Sulfurized Composition of Example | Coefficient of Friction | Percent Reduction |
|---|---|---|---|
| Baseline | None | 0.24–0.26(1) | — |
| 6A | D-4 | 0.09 | 65.4 |
| 7A | D-3 | 0.012 | 95.2 |
| 8A | D-1 | 0.074 | 69.2 |

(1) A baseline is run each day. Variation in the coefficient of friction value for the baseline is due to changes in temperature and also the age of the fluid.

The present invention is also directed to a method, comprising the steps of introducing into a well borehole a composition, comprising (A) at least one natural oil or synthetic triglyceride of the formula

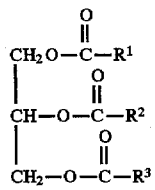

wherein $R^1$, $R^2$ and $R^3$ are independently saturated or unsaturated aliphatic groups that contain from about 7 to about 23 carbon atoms;

(B) at least one alcohol, $R^4OH$ wherein $R^4$ is an aliphatic group containing from 1 up to about 18 carbon atoms;

(C) at least one emulsifier; and (D) at least one sulfurized composition wherein (B), (C) and (D) are soluble and reside within (A);

wherein components (A), (B), (C) and (D) are as defined above, and drilling the well borehole.

What is claimed is:

1. An oil-in-water emulsion composition, comprising a mixture of a brine and (A) at least one natural oil wherein the natural oil is a genetically modified vegetable oil triglyceride of the formula

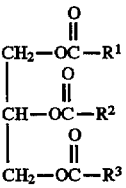

wherein $R^1$, $R^2$ and $R^3$ are aliphatic groups that contain from about 7 to about 23 carbon atoms and are at least 60 percent monounsaturated wherein the monounsaturated character is due to an oleic acid residue and further wherein an oleic acid moiety: linoleic acid moiety ratio is from 2 up to about 90 and further wherein the genetically modified vegetable oil is selected from the group onsisting of high oleic sunflower oil, high oleic safflower oil, high oleic corn oil, high oleic soybean oil, high oleic rapeseed oil, high oleic cottonseed oil, high oleic canola oil and high oleic peanut oil;

(B) at least one alcohol, $R^4OH$ wherein $R^4$ is an aliphatic group containing from 1 up to about 18 carbon atoms;

(C) at least one emulsifier wherein the emulsifier is a polyolefin amine ester/salt represented by a formula selected from the group of formulae (I) and (II)

$$\text{R}^5 \left\{ \begin{array}{c} \overset{O}{\underset{\|}{C}} - \overset{}{\underset{}{C}} - X - R^6N - R^8 \\ \overset{}{\underset{\|}{C}} - \overset{R^7}{\underset{}{C}} - O \\ \overset{}{\underset{\|}{C}} - \overset{}{\underset{}{C}} - O \\ O \end{array} \left( HOR^6 - \overset{R^7}{\underset{\underset{H}{|}}{N^\oplus}} - R^8 \right)_n \right\} \rightleftharpoons \text{R}^5 \left\{ \begin{array}{c} \overset{O}{\underset{\|}{C}} - \overset{R^7}{\underset{}{C}} - X - R^6 - NH - R^8 \\ \overset{}{\underset{\|}{C}} - CO^- \\ O \end{array} \left( HOR^6N - R^8 \right)_n \right\}$$

(I)    (II)

wherein n is zero or one, X is oxygen or NH; $R^5$ is a hydrocarbyl group containing from 20 to about 500 carbon atoms; $R^6$ is an alkylene moiety containing from 1 up to 4 carbon atoms; $R^7$ and $R^8$ are independently hydrogen, alkyl or hydroxy alkyl moieties containing 1 up to 4 carbon atoms, a polyolefin ester formed by the reaction of $$R^5 \left\{ \begin{array}{c} \overset{O}{\underset{\|}{C}} - C \\ \phantom{XX} \diagdown \\ \phantom{XX} \diagup O \\ C - C \\ \| \\ O \end{array} \text{ or } R^5 \left\{ \begin{array}{c} C - C - OH \\ \| \\ O \\ C - C - OH \\ \| \\ O \end{array} \right. \right. \quad \text{with} \quad (a)$$

$$R^9(OH)_m \quad (c)$$

where $R^5$ is a hydrocarbyl group containing from 20 to about 500 carbon atoms, $R^9$ is a hydrocarbyl group containing from about 2 to about 40 carbon atoms and m is an integer of from 2 to about 10, or a polyolefin salt formed by the coupling of a high molecular weight acylating agent a of the formula $$R^5 \left\{ \begin{array}{c} \overset{O}{\underset{\|}{C}} - C \\ \phantom{XX} \diagdown \\ \phantom{XX} \diagup O \\ C - C \\ \| \\ O \end{array} \text{ or } R^5 \left\{ \begin{array}{c} C - C - OH \\ \| \\ O \\ C - C - OH \\ \| \\ O \end{array} \right. \right.$$

and a low molecular weight acylating agent (d) of the formula $$R^{21} \left\{ \begin{array}{c} \overset{O}{\underset{\|}{C}} - C \\ \phantom{XX} \diagdown \\ \phantom{XX} \diagup O \\ C - C \\ \| \\ O \end{array} \text{ or } R^{21} \left\{ \begin{array}{c} C - C - OH \\ \| \\ O \\ C - C - OH \\ \| \\ O \end{array} \right. \right.$$

wherein $R^{21}$ is a hydrocarbyl group that contains from 1 up to 18 carbon atoms, wherein the coupling of a and d is accomplished with a coupling component (e) comprising (i) two or more primary amino groups, (ii) two or more secondary amino groups, (iii) at least one primary amino group and at least one secondary amino group, (iv) at least two hydroxyl groups, or (v) at least one primary or secondary amino group and at least one hydroxyl group to form an intermediate and reacting said intermediate with an amine (f) comprising ammonia, primary amines, secondary amines, hydroxyamines, primary and secondary monoamines and tertiary mono- and polyamines; and (D) a sulfurized composition wherein (B), (C) and (D) are soluble and reside within (A).

2. The composition of claim 1 wherein the triglyceride is at least 70 percent monounsaturated.

3. The composition of claim 1 wherein the triglyceride is at least 80 percent monounsaturated.

4. The composition of claim 1 wherein within (B) the alcohol $R^4OH$ is a secondary or primary alcohol and $R^4$ is branch or straight chained and contains from 3 up to about 12 carbon atoms.

5. The composition of claim 1 wherein within (B) the alcohol $R^4OH$ is a secondary alcohol and $R^4$ is branch chained and contains from 3 up to about 9 carbon atoms.

6. The composition of claim 1 wherein the alcohol $R^4OH$ is of the formula $$\begin{array}{c} CH_3 \quad OH \\ | \quad\quad | \\ CH_3CHCH_2CHCH_3. \end{array}$$

7. The composition of claim 1 wherein within (C) $R^5$ is a polyisobutenyl moiety containing from about 50 up to about 300 carbon atoms.

8. The compositions of claim 7 wherein within $$R^9(OH)_m$$

$R^9$ is a monovalent or polyvalent organic group jointed to the OH group through carbon-to-oxygen bonds and m is an integer of from 2 to about 6.

9. The composition of claim 7 wherein $R^6$ is ethylene and $R^7$ and $R^8$ are each methyl, ethyl or hydroxy ethyl groups.

10. The composition of claim 8 wherein $R^9(OH)_m$ is ethylene glycol.

11. The composition of claim 1 wherein $R^5$ is a poly (isobutylene)group.

12. The composition of claim 1 wherein $R^{21}$ is an alpha olefin selected from the group consisting of $C_{15-18}$ alpha olefins, $C_{12-16}$ alpha olefins, $C_{14-16}$ alpha olefins, $C_{14-18}$ alpha olefins and $C_{16-18}$ alpha olefins.

13. The composition of claim 1 wherein the coupling component (e) is a polyamine.

14. The composition of claim 1 wherein the coupling component (e) is a polyol of the formula $R^9(OH)_m$ wherein $R^9$ is a hydrocarbyl group containing from 2 to about 40 carbon atoms and m is an integer of from 2 to about 6.

15. The composition of claim 1 wherein the coupling component (e) is ethylene glycol.

16. The composition of claim 1 wherein the sulfurized composition is a sulfurized olefinic hydrocarbon or a sulfurized mixture of a triglyceride, a carboxylic acid and an olefin.

17. The composition of claim 16 wherein the sulfurized olefinic hydrocarbon is a sulfurized Diels-Alder adduct or a sulfurized terminal monoolefin.

18. The composition of claim 17 wherein the sulfurized olefinic hydrocarbon is a sulfurized Diels-Alder adduct in a molar ratio of sulfur to adduct of from about 1:2 to about 4:1 wherein the adduct comprises at least one dienophile selected from the group consisting of alpha, beta ethylenically unsaturated aliphatic carboxylic acid esters, alpha, beta ethylenically unsaturated aliphatic carboxylic acid amides, alpha, beta ethylenically unsaturated aliphatic halides, alkylacrylates and alpha methyl alkylacrylates wherein the alkyl group contains from 1 to 10 carbon atoms with at least one aliphatic conjugated diene corresponding to the formula

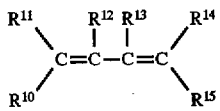

wherein $R^{10}$ through $R^{15}$ are each independently selected from the group consisting of hydrogen, alkyl, halo, alkoxy, alkenyl alkenyloxy, carboxy, cyano, amino, alkylamino, dialkylamino, phenyl, and phenyl substituted with one to three substituents corresponding to $R^{10}$ through $R^{15}$.

19. The composition of claim 18 wherein the diene is further characterized in that $R^{12}$ and $R^{13}$ are hydrogen and $R^{10}$, $R^{11}$, $R^{14}$ and $R^{15}$ are each independently hydrogen, chloro, or lower alkyl.

20. The composition of claim 19 wherein the diene is piperylene, isoprene, methylisoprene, chloroprene, or 1,3-butadiene.

21. The composition of claim 20 wherein the dienophile is an ester of acrylic acid or methacrylic acid.

22. The composition of claim 21 wherein the dienophile is an alkyl ester of acrylic acid or methacrylic acid containing at least 4 carbon atoms in the alkyl group.

23. The composition of claim 22 wherein the dienophile is butyl acrylate or butyl methacrylate.

24. The composition of claim 23 wherein the diene is 1,3-butadiene.

25. The composition of claim 17 wherein the sulfurized olefinic hydrocarbon is a sulfurized terminal monoolefin prepared by reacting at about 50°–300° C., under superatmospheric pressure and in the presence of a catalyst, sulfur and hydrogen sulfide with at least one terminal aliphatic monoolefinic compound containing from about 3 to about 30 carbon atoms to form a sulfurized mixture; about 0.1–1.5 moles of sulfur and hydrogen sulfide being used per mole of olefinic compound; and removing from said sulfurized mixture substantially all low boiling materials including unreacted monoolefin, mercaptan and monosulfide.

26. The composition of claim 25 wherein about 0.4–0.8 mole of hydrogen sulfide is used per mole of monoolefinic compound.

27. The composition of claim 26 wherein the monoolefinic compound is an olefinic hydrocarbon containing about 3–16 carbon atoms.

28. The composition of claim 27 wherein the olefin is selected from the group consisting of propylene, isobutene, and their dimers, trimers, and tetramers, and mixtures thereof.

29. The composition of claim 28 wherein the olefin is isobutene or diisobutene.

30. The composition of claim 16 wherein the triglyceride is a vegetable oil triglyceride of the formula

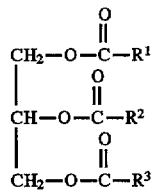

wherein $R^1$, $R^2$ and $R^3$ are aliphatic groups containing from about 7 up to about 23 carbon atoms.

31. The composition of claim 30 wherein the vegetable oil selected from the group consisting of peanut oil, cottonseed oil, soybean oil, corn oil, sunflower oil, safflower oil and rapeseed oil.

32. The composition of claim 16 wherein the carboxylic acid is an alkenyl carboxylic acid of the formula $$R^{20}COOH$$

wherein $R^{20}$ contains from 7 up to about 29 carbon atoms.

33. The composition of claim 32 wherein the carboxylic acid is oleic acid, linoleic acid, linolenic acid, 14-hydroxy-11-eisocenoic acid or ricinoleic acid.

34. The composition of claim 16 wherein the olefin is an aliphatic monoolefin that contains from 4 up to about 36 carbon atoms.

35. The composition of claim 16 wherein the olefin is an aliphatic ∝-olefin that contains from 12 up to about 20 carbon atoms.

36. The composition of claim 16 wherein the weight ratio of the combination of triglyceride, carboxylic acid and olefin to sulfur is about 5–15:1.

37. The composition of claim 1, further comprising (E) at least one weighting agent or (F) at least one clay.

38. The composition of claim 37 wherein the weighting agent (E) selected from the group consisting of barium sulfate, iron oxide, calcium chloride, calcium bromide, zinc bromide or zinc chloride.

39. The composition of claim 37 wherein the clay (F) selected from the group consisting of bentonite, attapulgite, sepiolite, montmorillonite, hectorite, saponite, and illite.

40. The composition of claim 1 wherein the brine is present in the mixture in an amount of about 10 to about 95 parts by volume, and the (A)–(D) is present in the mixture in an amount from about 5 to about 90 parts by volume, wherein the total parts by volume of brine and (A)–(D) is 100 parts.

41. The composition of claim 1 where the brine is a continuous phase and the oil (A) and the components soluble within the oil is a discontinuous phase.

* * * * *